Nov. 28, 1933.  W. J. COULTAS ET AL  1,936,661
CORN HARVESTER
Filed April 30, 1932  3 Sheets-Sheet 1

INVENTORS:
Wilbur J. Coultas
Axel W. Swenson
Ricardo Lopez
By: Brown, Jackson, Boettcher & Dienner
ATTORNEYS.

WITNESS
WALTER ACKERMAN

Nov. 28, 1933.  W. J. COULTAS ET AL  1,936,661
CORN HARVESTER
Filed April 30, 1932   3 Sheets-Sheet 3

INVENTORS:
Wilbur J. Coultas
Axel W. Swenson
Ricardo Lopez
By: Brown, Jackson, Boettcher & Dienner
ATTORNEYS.

Patented Nov. 28, 1933

1,936,661

UNITED STATES PATENT OFFICE 1,936,661

CORN HARVESTER

Wilbur J. Coultas and Axel W. Swenson, Moline, Ill., and Ricardo Lopez, Montevideo, Uruguay, assignors to Deere & Company, Moline, Ill., a corporation of Illinois Application April 30, 1932. Serial No. 608,358

27 Claims. (Cl. 56—18)

This invention relates to agricultural implements, and more particularly to improvements in corn harvesters, specifically, those harvesters of the type in which the main supporting frame of the machine and the mechanisms carried thereby is rocked as a unit over a supporting axle to tilt the machine.

The principal object of the present invention is to provide an improved bagging apparatus or attachment for a corn harvester of this type comprising an elevator rigidly mounted on the main supporting frame of the harvester to tilt therewith, and a bagging chute and operator's platform associated with said elevator and non-tiltably supported on the harvester.

Another object of the invention is to mount the elevator on the main frame of the machine between the supporting wheels thereof and adjacent one of said wheels, and to support the operator's platform on the outer side of the latter supporting wheel, thereby providing a more equal distribution of the weight of the operating parts of the machine on the carrying wheels.

A still further object of the invention is to mount the operator's platform on the machine that it extends outwardly therefrom in a horizontal plane when in operating position, but which is adapted to be swung up to position it in a substantially vertical plane when in inoperative position, thereby cutting down the overall width of the implement, for transport, particularly where the operator's platform is supported on the outer side of the adjacent supporting wheel.

Another object of the present invention is to provide a bagging attachment in which the elevator is mounted on the main frame of the harvester while the operator's platform is carried partly by the main frame and partly by the draft frame.

These and other objects and advantageous features will be apparent from the following description of the preferred embodiment of our invention illustrated in the accompanying drawings, in which.

Figure 1:
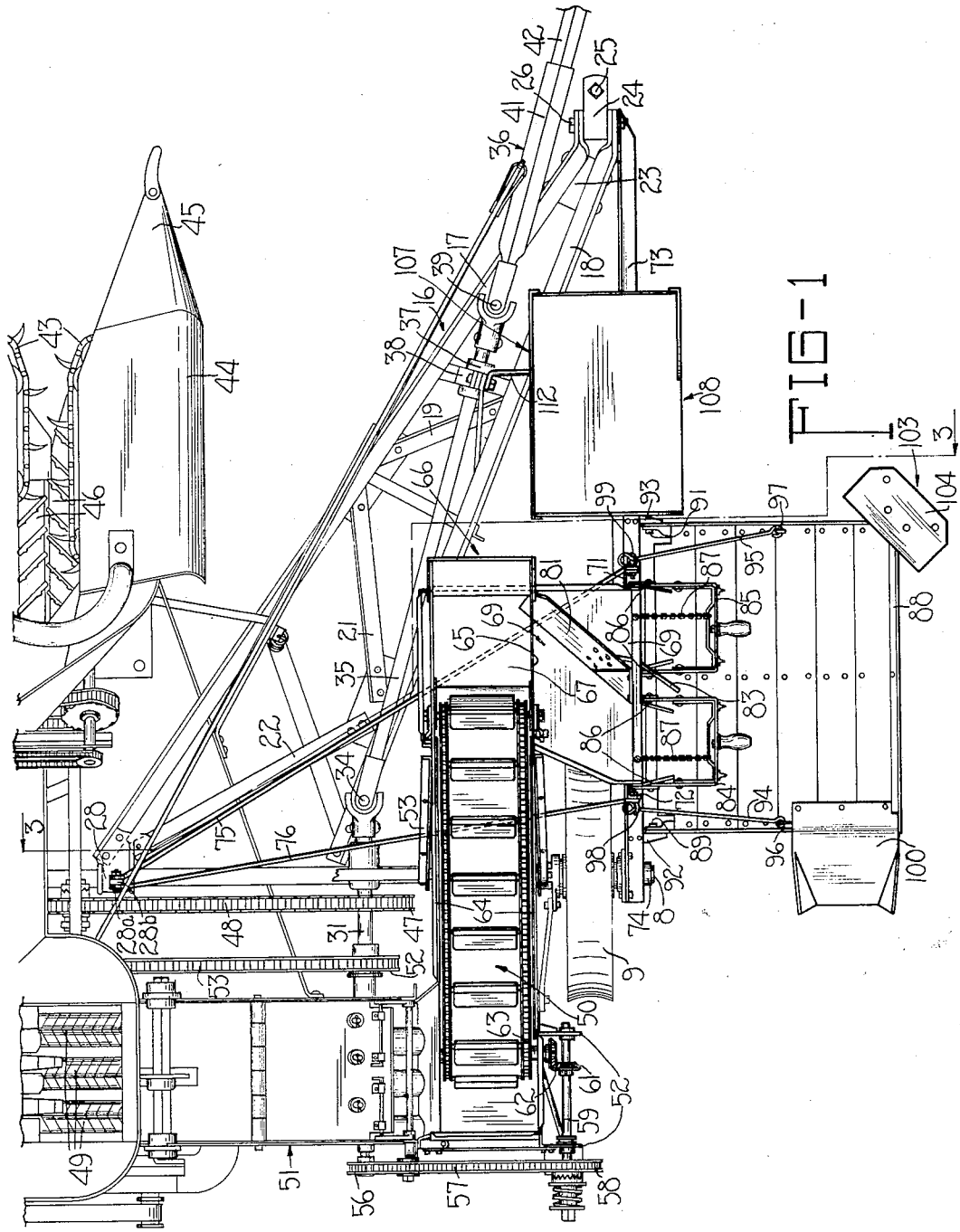
Figure 1 is a top plan view of a corn harvester equipped with our improvements, a portion of the left hand side of the harvester being broken away.

In the drawings we have illustrated our improvements as being embodied in or attached to a corn harvester similar to that illustrated in the pending application of Wilbur J. Coultas and Norman F. Andrews, Serial No. 395,510, filed September 27, 1929, and therefore certain parts of the harvester will be but briefly described since a detailed description of the same is not necessary.

Figure 3:
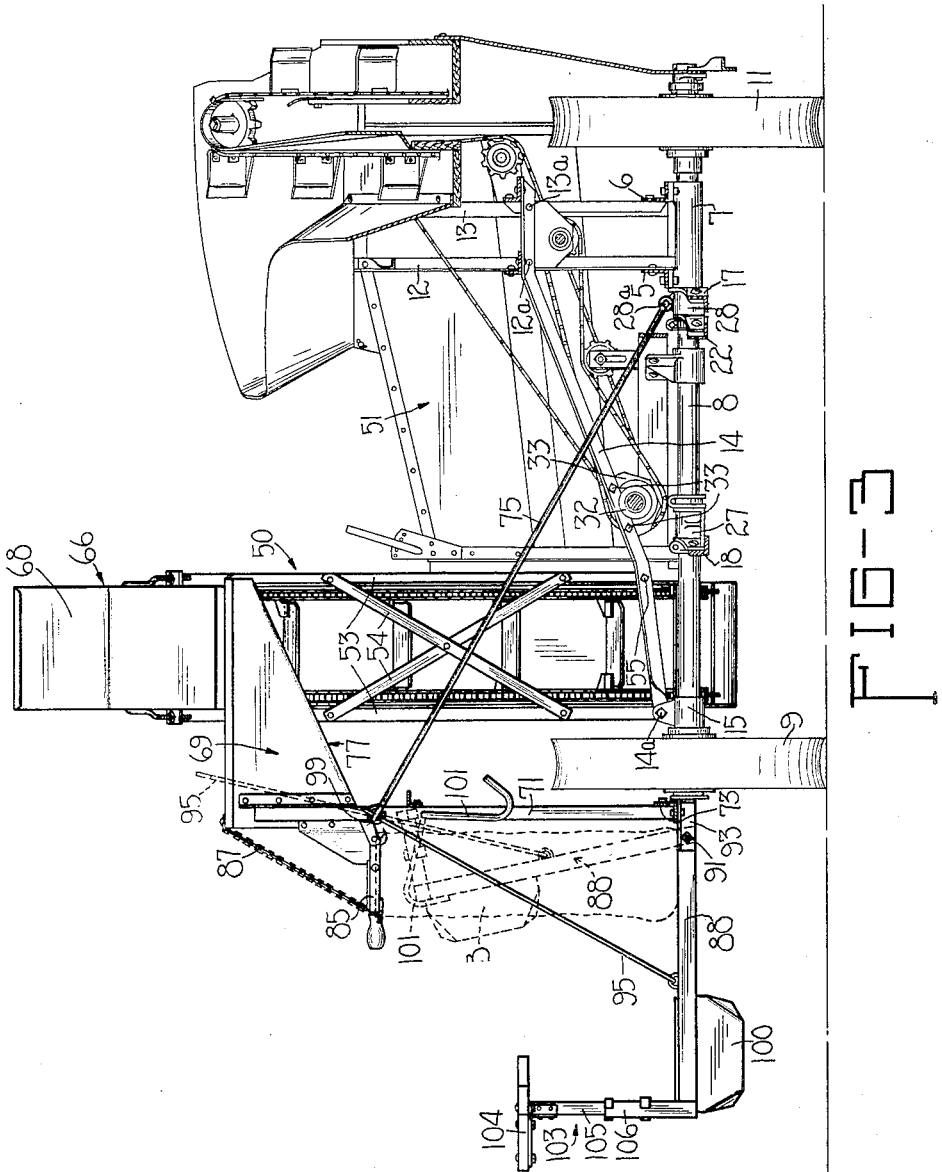
Figure 3 is a transverse sectional view taken approximately on the plane of the line 3—3 of Figure 1, and illustrating the manner of supporting the elevator of the bagging attachment on the main supporting frame of the harvester and the bagging chute and operator's platform on the axle and draft frame.

In the accompanying drawings only such parts of the main frame of the corn harvester as are necessary to an understanding of the present invention have been illustrated. This main frame is preferably of angle iron construction and comprises two rails or frame members 5 and 6 shown in section in Figure 3 which extend longitudinally of the machine in parallel relation. Said rails are suitably secured to a sleeve 7, as by being riveted to elements of the sleeve, this sleeve being pinned or otherwise suitably secured on a supporting axle 8. Ground wheels 9 and 11 are rotatably mounted upon the axle at the end portions thereof and support the machine for travel over the ground surface. By virtue of this construction the main frame of the harvester is tiltable about the axis of its supporting wheels. The main frame also includes, as shown in Figure 3, upright members or bars 12 and 13, which support other rails of the frame, and a transversely extending brace member 14 having one end riveted or otherwise suitably secured as at 12a and 13a to the two upright members 12 and 13 and extending laterally and downwardly therefrom. The opposite end of the member 14 is secured by a bolt or rivet 14a to an attaching element of a sleeve 15 pinned or otherwise suitably secured to the axle 8 adjacent the inner side of the ground wheel 9. The use made of this frame member 14 will be hereinafter described.

A draft member 16 is provided for attaching the implement to a tractor or other source of draft. This draft member extends forwardly from the axle 8 and at an inclination towards the outer side of the machine, the term "outer side" being used with reference to the corn row being harvested, the snapping rolls and associated mechanisms being disposed adjacent the supporting wheel 11 and at the side of the machine at which the corn is harvested, this latter side of the machine being therefore considered as the inner side thereof. The draft member 16 comprises angle bars 17 and 18 connected by inclined angle braces or struts 19, 21 and 22.

The bars 17 and 18 converge forwardly of the implement and are connected, adjacent their forward ends, by a plate 23, suitably secured thereto. The forward ends of the rails are suitably shaped and spaced to receive between them a loop 24 adapted to be pivotally connected to the draw bar of a tractor or other source of draft by a vertically extending pivot bolt 25. A connecting pin or bolt 26 is inserted through the loop 24 and the forward ends of the bars or rails 17 and 18. The rail 18 is secured at its rearward end to a sleeve 27 mounted upon the axle 8 for turning movement about the same, and the rearward end of the rail 17 is secured to a sleeve 28 also mounted for turning movement thereon. In this manner the draft member is connected to the implement for relative turning movement about the axis on which the implement has tilting movement.

The power shaft of the implement, indicated by 31, is disposed generally longitudinally of the main frame of the implement and is rotatably mounted adjacent its rear end, in a suitable bearing bracket, (not shown), while its forward end is rotatably mounted, as best shown in Figure 3, in a bearing sleeve secured to a plate 33 fastened to the brace member 14 by rivets or bolts 33a and depending therefrom.

As best shown in Figure 1, the implement power shaft 31 extends forwardly for a short distance beyond the axle 8, and the forward end of the shaft is connected by a universal joint 34 to the rearward end of a transmission shaft comprising a rear section 35 and a front telescopic section 36. The front section of the transmission shaft is mounted for rotation and for endwise movement in a bearing sleeve 37 supported by a bracket structure 38 carried by the draft member 16. At its forward end the rear section 35 is connected by a universal joint 39 to a tubular member 41 of the front section 36 of this shaft, said tubular member having a non-circular bore which receives a correspondingly shaped member 42 of shaft section 36, said member 42 extending forwardly for suitable connection with the power take-off shaft of a drawing tractor.

Power is thus transmitted through said transmission shaft 31 from the power take-off shaft of a tractor to the implement power shaft, all as fully explained in said Coultas and Andrews application above mentioned. As usual, the harvester also comprises gathering chains 43 partially enclosed by sheet metal housings 44 provided with shoes 45, and snapping rolls 46. The gathering chains and snapping rolls are driven from the power shaft 31 of the implement through suitable driving mechanism including a sprocket wheel 47 secured to said shaft and a chain 48 trained around said wheel.

The ears of corn are delivered from the snapping rolls to a suitable elevator delivering the ears to husking rolls 49 enclosed within the usual husking box 51. The elevator is driven through any suitable driving mechanism from the power shaft 31, and the husking rolls are also driven from the power shaft 31 by suitable mechanism including a sprocket wheel 52 secured to said shaft and a chain 53 trained around said wheel.

Since the present invention is not particularly concerned with these parts per se, it is believed that the short description of them above given will suffice. A full understanding of the complete details and operation of these various parts may be had from a reference to the Coultas and Andrews application above mentioned, if desired.

Coming now to the bagging apparatus or attachment that forms the subject matter with which the present invention is principally concerned, it may be well to explain first that such attachment is adapted to be incorporated in a conventional type of corn harvester, such as that shown in the above mentioned Coultas and Andrews application, and that when it is desired to connect such attachment to the machine the ordinary wagon elevator is disconnected therefrom and the bagging attachment elevator substituted therefor. The main axle of the machine may also be lengthened to provide space between the end of the husking rolls and the right hand supporting wheel 9 for the attachment elevator which is arranged longitudinally of the machine.

The elevator of the bagging attachment is indicated as a whole by the reference numeral 50, and it is disposed in a longitudinally extending position in the space between the end of the husking box 51 and the right hand carrying wheel 9. The lower end of the elevator 50 is rigidly fixed in any suitable manner to brackets 52 (see Figure 1) on which the usual wagon elevator is ordinarily mounted. This elevator 50 extends upwardly and forwardly from such husking box, and the upper end thereof is supported by a suitable framework comprising two upright spaced parallel members 53 rigidly braced together by means of diagonally extending cross braces 54. The outer upright member 53 is fixed at its lower end to the transversely extending frame member 14 above described by the bolt or rivet 14a, while the lower end of the inner upright member 53 is fixed to the transversely extending frame member 14 by a bolt or rivet 55.

The elevator 50 is driven from the power shaft 31 of the implement through the instrumentality of a sprocket gear 56 keyed to the rear end of the implement power shaft 31, a chain 57 trained around said gear and around a second gear 58 fixed to a shaft 59 supported in suitable journal bearings in the brackets 52, and a bevel gear 61 fixed on said shaft 59 which meshes with a bevel gear 62 fixed to a shaft 63, to which shaft is operatively connected the usual elevator operating mechanism such as is commonly employed in elevators of this type and which need not be described in detail herein.

Figure 2:
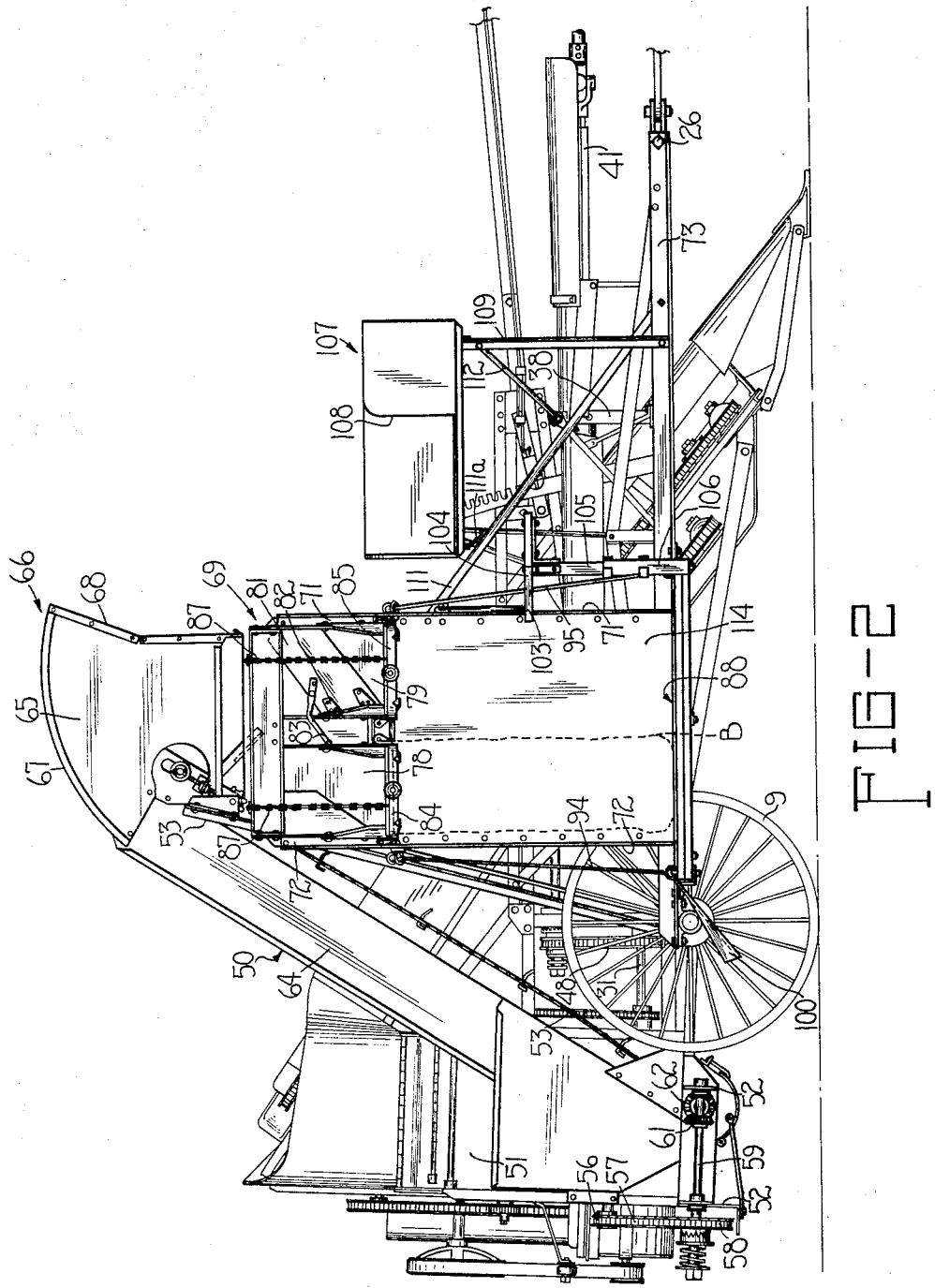
Figure 2 is a side elevational view of the machine shown in Figure 1.

As shown in Figure 2, the elevator 50 is provided with side wall members 64 which extend from the husking box 51 to the top of the elevator and are suitably secured to the side wall members 65 of a hood 66 which is open at its rear end to receive the corn ears from the elevator and is provided with an arcuate-shaped top wall 67 extending upwardly from the top of the elevator and a sloping front end wall 68. The hood 66 serves to direct the ears of corn deposited off the end of the elevator into a bagging hopper indicated as a whole by 69.

The hopper 69 is supported by two angle iron uprights 71 and 72 fixed at their lower ends, as shown in Figures 2 and 3, to a longitudinally disposed angle iron member 73 connected at its rear end to a casting 74 journaled on the extended end of the axle 8 (see Figure 2) and having its forward end connected to the forward portion of the draft frame 16 by means of the pivot bolt 26 above described. The uprights 71 and 72 are braced by means of tension rods 75 and 76, respectively, which extend downwardly from a point adjacent the bottom of the hopper 69 and are connected at their lower ends by bolt 28ª with an attaching member or ear 28ᵇ formed on the sleeve 28 to which the frame members 17 and 22 of the draft frame 16 are connected, as shown in Figures 1 and 3.

When the machine is tilted, the elevator 50 being rigidly supported on the main frame of the machine, tilts with such main frame, but the bagging hopper 69 being supported on the member 73 and the draft frame 16 does not move with the tilting of the machine. Therefore, sufficient space is provided below the upper end of the elevator 50 and the hood 66 thereof, and the top of the hopper 69 to accommodate this relative movement.

The bagging hopper 69 extends outwardly at right angles from the hood 66 of the elevator and is provided with a sloping bottom 77 providing a hopper relatively shallow at its inner receiving end and relatively deep at its outer or delivery end. The ears of corn are received from the hood 66 into the shallow side of the hopper so that they roll or slide down the sloping bottom thereof to the deep side thereof. The hopper is provided in the wall on its deep side with two openings 78 and 79 and a deflecting shield 81 is pivotally connected on an axis perpendicular to the sloping bottom 77 by hinges 82 (see Figure 2) to this side wall so that it may be swung from one side of the hopper to the other to optionally direct the ears of corn deposited therein to either one of the openings 78 or 79. The position of the shield 81 is controlled by a handle member 83 (see Figures 1 and 2). Bag holders 84 and 85 of ordinary construction are secured to the hopper below the openings 78 and 79, respectively, for supporting the ear receiving bags below said openings. One of said bags is illustrated in Figures 2 and 3 in dotted lines and is indicated by the letter B. The bag holders 84 and 85 are pivotally connected to the hopper as at 86 and are held in position by chains 87 connected therewith and with the top of the hopper.

As will be readily understood, when one bag has been filled with corn ears from the hopper 69 the shield 81 is swung over to direct the ears being delivered to the hopper from the elevator to the second opening in the wall of the hopper 69 for delivery to the second or unfilled bag, and while such second bag is being filled with the ears of corn the attendant removes the first bag from the bag holder and replaces the same with an empty bag for receiving the corn ears after the second bag has been filled and the corn ears again directed to the first opening.

The platform on which the attendant stands to remove and replace the bags into which the corn ears are deposited from the hopper 69 is indicated as an entirety by the reference numeral 88. This platform is pivotally connected at the opposite ends of its inner edge by pivot bolts 89 and 91 to brackets 92 and 93, respectively, rigidly secured to and extending outwardly laterally from the longitudinally disposed member 73 of the bagging attachment, as best shown in Figure 1. The platform is supported in an extended operative position by means of a pair of supporting rods 94 and 95, respectively, connected at their lower ends to said platform adjacent the front and rear ends thereof as shown at 96 and 97. The upper ends of the rods 94 and 95 extend through eyes 98 and 99 bolted to the uprights 72 and 71, respectively, which support the bagging hopper 69. The rods 94 and 95 have loops at their upper ends to serve as abutments by which the platform 88 is held in extended position. See Figure 1. The eyes 98 and 99 also serve to connect the upper ends of the rods 75 and 76 with the uprights 71 and 72. A chute 100 is provided on the rear right hand corner of the platform as shown in Figure 1 for guiding the filled bags to the ground that have been deposited therein by the operator.

By reason of the hinge connection between the platform and the longitudinally extending frame member 73 of the bagging attachment the platform may be swung up into a substantially vertical position as shown in dotted lines in Figure 3 for transport purposes. During such swinging movement of the platform the rods 94 and 95 slide upwardly in the eyes 98 and 99. A hook member 101 suitably pivotally connected with the upright 71 is hooked over the outer edge of said platform when it is raised to hold it in such elevated position.

A removable seat 103 is provided on the forward right hand corner of the platform for the convenience of the operator handling the bags, as best shown in Figure 3, and this seat comprises a bottom 104 fixed to the upper end of a short piece of angle iron 105 which telescopes in a tubular sleeve member 106 suitably fixed to the platform frame. When the platform is swung up to inoperative position as above mentioned, the seat 103 is first removed from the sleeve member 106.

A container 107 having an open top and cut away side 108 is provided for holding a supply of empty bags. This container is supported by means of a vertically extending member 109 and a diagonal brace member 111 both extending upwardly from the frame member 73 of the bagging attachment. The diagonal brace member is connected at its upper end to the upright 71 and the rear end of the container is connected to the diagonal brace member 111 by a bracket 111ª as shown in Figure 2. Said brace member 111 therefore performs the dual function of supporting the rear end of the container 107 and reinforcing the upright 71 which supports the forward end of the bagging hopper. The member 109 is suitably braced by a brace rod 112 secured at its upper end to the upper end of the member 109 and having its lower end connected to the bracket 38 which supports the bearing 37 of the power take-off shaft previously described.

A sheet metal guard plate 114 is provided for closing the space between the uprights 71 and 72 and the bottom of the hopper 69 and the frame member 73.

We claim:—

1. In a corn harvester, the combination of a bagging apparatus including a tiltable supported elevator, and a hopper separate from said elevator for receiving the ears from said elevator and non-tiltably supported on said harvester.

2. In a corn harvester, the combination of a bagging apparatus including a tiltably supported elevator, and an operator's platform for the bagging apparatus non-tiltably supported on said harvester.

3. In a corn harvester, the combination of a bagging apparatus comprising, a tiltably supported elevator, and an ear receiving hopper and operator's platform non-tiltably supported on said harvester.

4. In a corn harvester, the combination of a bagging apparatus comprising a tiltably supported elevator, an ear receiving hopper and operator's platform non-tiltably supported on said harvester, and pivot means connecting said platform with said harvester whereby it may be swung upwardly to inoperative position.

5. The combination with a corn harvester comprising an axle, a rigid draft frame, and a supporting frame mounted for fore and aft tilting movement on a transverse axis, of a bagging apparatus including an elevator rigidly mounted on said supporting frame to tilt therewith, and an ear receiving hopper non-tiltably supported on said axle and said draft frame adjacent the delivery end of said elevator.

6. The combination with a corn harvester comprising an axle, a rigid draft frame, and a supporting frame mounted for fore and aft tilting movement on said axle, of a bagging apparatus including an elevator rigidly mounted on said supporting frame to tilt therewith, and an operator's platform supported on said axle and said draft frame adjacent the delivery end of said elevator.

7. The combination with a corn harvester comprising an axle, a rigid draft frame, and a supporting frame mounted for fore and aft tilting movement on said axle, of a bagging apparatus including an elevator rigidly mounted on said supporting frame to tilt therewith, an operator's platform supported on said axle and said draft frame adjacent the delivery end of said elevator, and pivot means connecting said platform with said harvester whereby it may be swung upwardly to inoperative position.

8. The combination with a corn harvester comprising an axle, a rigid draft frame, and a supporting frame mounted for fore and aft tilting movement on said axle, of a bagging apparatus comprising an elevator rigidly mounted on said supporting frame to tilt therewith, and an ear receiving hopper and operator's platform supported on said axle and said draft frame adjacent the delivery end of said elevator.

9. A corn harvester comprising in combination, a draft frame, a wheel supported main frame, and a bagging apparatus including a platform movably supported by said draft frame in operating position, and means connecting said platform with said draft frame whereby said platform may be moved upwardly to inoperative position.

10. A corn harvester comprising in combination, a draft frame, a wheel supported main frame, and an operator's platform pivotally connected with said draft frame whereby said platform may be swung upwardly to a substantially vertical position for transport.

11. A corn harvester comprising in combination, a draft frame, a wheel supported main frame, and a bagging apparatus including a platform movably supported by said draft frame in operating position, means connecting said platform with said draft frame whereby said platform may be moved upwardly to inoperative position, and means carried by the draft frame for holding said platform in inoperative position.

12. In a corn harvester including an axle and supporting wheels therefor, the combination of a bagging apparatus including an elevator supported on the harvester on the inner side of one of the supporting wheels.

13. In a corn harvester including an axle and supporting wheels therefor, the combination of a bagging apparatus comprising an elevator supported on the harvester on the inner side of one of the supporting wheels, and an operator's platform supported on the harvester on the outer side of said supporting wheel.

14. In a corn harvester including an axle and supporting wheels therefor, the combination of a bagging apparatus including an elevator supported on said axle on the inner side of one of the supporting wheels, and an operator's platform at least partially supported on said axle on the outer side of said supporting wheel.

15. The combination with a corn harvester comprising an axle, a draft frame, and a main supporting frame mounted for fore and aft tilting movement on said axle, of a longitudinally extending bar connected with said axle and with the forward end of said draft frame, spaced upright members supported by said bar, a platform connected with said bar, supporting rods connecting said platform with the upper ends of said upright members, and brace rods connected respectively with the upper ends of said upright members and with the rear end of said draft frame.

16. The combination with a corn harvester comprising an axle, a draft frame, and a main supporting frame mounted for fore and aft tilting movement on said axle, of a longitudinally extending bar connected with said axle and with the forward end of said draft frame, spaced upright members supported by said bar, brace rods connected respectively with the upper ends of said upright members and with the rear end of said draft frame, a platform pivotally connected with said bar, eye-bolts carried by said upright members adjacent their upper ends, and supporting rods pivotally connected at their lower ends with said platform and extending through said eye-bolts whereby said rods support said platform in operative position and are slidable in said eye-bolts to permit said platform to be swung on its pivot to inoperative position.

17. A corn harvester comprising in combination an elevator, means supporting said elevator on said harvester for fore and aft tilting movement, an ear receiving hopper adjacent the delivery end of said elevator and an operator's platform carried by said harvester below said hopper, means for supporting said hopper and said platform in relatively fixed position on said harvester, said hopper being spaced from said elevator to accommodate for relative movement between said elevator and said hopper upon tilting of said elevator.

18. A corn harvester comprising in combination an axle, a draft frame, a main frame supported on said axle for fore and aft tilting movement thereon, a longitudinally and upwardly extending elevator mounted at its rear end on said main frame, supporting means for the opposite end of said elevator comprising sleeves journaled on said axle and vertically extending bars connected therewith, and an ear receiving hopper and operator's platform rigidly supported on said axle and said draft frame for non-tilting movement.

19. In a corn harvester comprising an axle, a draft frame, a main supporting frame mounted for tilting movement on said axle, brackets carried by said frame and adapted to receive a wagon elevator, the combination of a bagging attachment for said harvester comprising an elevator, means supporting one end of said elevator on said brackets, means supporting the other end of said elevator on said main supporting frame for tilting movement therewith, and a bagging hopper and an operator's platform carried by said axle and said draft frame and disposed to receive the discharge from said elevator.

20. In a corn harvester comprising an axle, supporting wheels journaled thereon, a main supporting frame mounted for tilting movement on said axle, a draft frame connected at its rear end with said axle, a husking unit carried by said main supporting frame, and brackets on the frame adjacent said husking unit and adapted to receive one end of a wagon elevator, the combination of a bagging attachment comprising a longitudinally extending elevator having one end carried by said brackets inwardly of the adjacent supporting wheel, means supporting the other end of said elevator on said main supporting frame, a hood for the discharge end of said elevator and including a discharge opening, a bagging hopper and operator's platform carried at its rear end on said axle and at the forward end thereof on said draft frame, said operator's platform being disposed outside of said supporting wheel, and a container for empty bags carried by said platform.

21. A corn harvester comprising, in combination, a bagging apparatus including an elevator, and a hopper for receiving the ears from said elevator, said elevator and said hopper being supported for relative movement with respect to each other.

22. A corn harvester comprising, in combination, a bagging apparatus including an elevator, and an operator's platform for the bagging apparatus, said elevator and said platform being supported for relative movement with respect to each other.

23. A corn harvester comprising, in combination, a bagging apparatus comprising an elevator, and an ear receiving hopper and operator's platform, said elevator being supported for relative movement with respect to said hopper and said platform.

24. A corn harvester comprising, in combination, two relatively tiltable frames, a bagging apparatus including an elevator mounted on one of said frames, and a hopper for receiving the ears from said elevator mounted on the other of said frames.

25. A corn harvester comprising, in combination, two relatively tiltable frames, a bagging apparatus including an elevator mounted on one of said frames, and an operator's platform for the bagging apparatus mounted on the other of said frames.

26. A corn harvester comprising, in combination, two relatively tiltable frames, a bagging apparatus including an elevator mounted on one of said frames, and an ear receiving hopper and operator's platform mounted on the other of said frames.

27. A corn harvester comprising, in combination, two relatively tiltable frames, a bagging apparatus including an elevator mounted on one of said frames, an operator's platform for the bagging apparatus mounted on the other of said frames, and pivot means connecting said platform with its supporting frame whereby it may be swung upwardly to inoperative position.

WILBUR J. COULTAS.
AXEL W. SWENSON.
RICARDO LOPEZ.